United States Patent
Jones, II et al.

[11] Patent Number: 6,024,417
[45] Date of Patent: Feb. 15, 2000

[54] AXLE FILTER FOR INTERNALLY VENTED WHEEL ASSEMBLY

[75] Inventors: Ronald Lee Jones, II, North Canton; Jay Dudley White, Massillon; Theodore Frank Yurek, Alliance, all of Ohio

[73] Assignee: The Boler Company., Itasca, Ill.

[21] Appl. No.: 09/163,519

[22] Filed: Sep. 30, 1998

[51] Int. Cl.$^7$ .................................................. B60B 35/00
[52] U.S. Cl. ........................................ 301/124.1; 301/126
[58] Field of Search .............................. 302/108.1, 124.1, 302/105.1; 301/126, 131, 108.2, 108.3, 108.4, 108.5

[56] References Cited

U.S. PATENT DOCUMENTS

| | | | |
|---|---|---|---|
| 2,299,796 | 10/1942 | Chase | 301/108.1 |
| 3,003,834 | 10/1961 | Pendleton | 301/108.1 |
| 5,098,168 | 3/1992 | Johnson | 301/108.1 |
| 5,195,807 | 3/1993 | Lederman | 301/108.1 |
| 5,482,358 | 1/1996 | Kuck | 301/108.1 |
| 5,492,393 | 2/1996 | Peisker et al. | 301/108.1 |
| 5,538,330 | 7/1996 | Ehrlich | 301/108.1 |
| 5,664,846 | 9/1997 | Kuck | 301/108.1 |
| 5,752,746 | 5/1998 | Perry | 301/108.1 |
| 5,785,390 | 7/1998 | Gold et al. | 301/108.1 |
| 5,860,708 | 1/1999 | Borders et al. | 301/108.1 |

*Primary Examiner*—S. Joseph Morano
*Assistant Examiner*—Long Bao Nguyen
*Attorney, Agent, or Firm*—David P. Dureska; Buckingham, Doolittle & Burroughs, LLP

[57] ABSTRACT

A filter is disposed in the interior cavity of each of the axle spindle sections of a non-drive axle for a heavy duty tractor-trailer, which utilizes internally vented wheel end assemblies. Each filter provides for sufficient air flow from the wheel end assembly cavity into the axle cavity to enable internal venting of any expanding gas from the wheel end assembly cavity into the axle cavity, thereby preventing excessive pressure build-up in the wheel end assembly and possible reduction of the life expectancy of the wheel end assembly main seal. Depending on the filter embodiment employed, the filter prevents or at least lessens the likelihood of migration of contaminates such as oxide scale from the axle cavity into the wheel end assembly cavity, thereby preventing or lessening the likelihood that such contaminates will cause premature wear of the wheel end assembly bearings or main seal.

14 Claims, 7 Drawing Sheets

AXLE FILTER FOR INTERNALLY VENTED WHEEL ASSEMBLY

BACKGROUND OF THE INVENTION

1. Field of the Invention

The invention relates to vehicle wheel end assemblies and in particular to heavy-duty tractor-trailer wheel end assemblies. More particularly, the invention is directed to a heavy duty tractor-trailer wheel end assembly which is internally vented to the vehicle non-drive axle, and in which a filter is incorporated in the axle for preventing migration of contaminants from the interior of the axle to the wheel end assembly thereby preventing premature degradation of the wheel end assembly bearings and/or main seal.

2. Background Art

For many years the heavy-duty tractor-trailer industry has utilized wheel end assemblies which typically are mounted on each end of one or more non-drive axles. Each wheel end assembly typically includes a hub rotatably mounted on a bearing assembly, which in turn is immovably mounted on one of the outboard ends or spindles of the axle. As is well known to those skilled in the art, for normal operation of the wheel end assembly to occur, it must be lubricated with grease or oil and the entire assembly sealed to prevent leakage of the lubricant and also to prevent contaminates from entering the wheel end assembly which could be detrimental to its performance. More specifically, a hubcap is mounted on an outboard end of the hub and a main seal is rotatably mounted on an inboard end of the hub and bearing assembly in abutment with the axle spindle, resulting in a closed or sealed wheel end assembly.

However, during normal operation of a tractor-trailer, heat is generated within the sealed non-drive wheel end assembly due to the friction of the bearings under load. The air or internal atmosphere trapped in the sealed wheel end assembly expands in response to the increased temperature in accordance with well known pressure laws. Moreover, variations in external atmosphere operating conditions such as weather, altitude and temperature can also increase pressure within the sealed wheel end assembly. It follows that if such increased wheel end assembly pressure is not released or reduced, then the main rotating seal of the wheel end assembly is subjected to excessive side loading which leads to premature wear of the seal. Such premature seal wear can in turn result in loss of lubrication from the wheel end assembly and possible premature excessive wear of the bearing assembly.

Heretofore, primarily two methods for managing non-drive wheel end assembly pressure build-up have been utilized. One extensively used prior art method is an external venting system, which vents pressure from the wheel end assembly to the external atmosphere through a port formed usually in the hubcap. The wheel end assembly typically is protected against infiltration of contaminates by a filter element which extends across the open port, or alternatively by a baffle arrangement of open ports. However, it has been found that such an external venting system is not always reliable. More specifically, such a system has been found to allow ingress of water and small particle contaminates into the wheel end assembly, which in turn can adversely affect the life of the bearing assembly and/or main seal. Moreover, it has been found that such external venting systems also can become blocked due to corrosion from road salt or contamination from the external atmosphere, resulting in a build-up of pressure in the wheel end assembly and possible shortening of the life expectancy of the seal.

A second prior art method that often has been used is an internal venting system. More particularly, internal venting systems provide for the flow of expanding gases from the non-drive wheel end assembly into the internal cavity of the hollow non-drive axle, which serves as an accumulator. As is well known in the art and literature, the pressure increase of the expanding gas in the wheel end assembly will be less due to a larger available volume for expansion of the gas into the axle cavity. Since the wheel end assembly remains sealed to the external atmosphere, the bearing assembly and main seal both are protected from external contaminates such as those that plague external venting systems. However, the heavy-duty tractor-trailer industry recently has discovered that debris from the internal surface of the axle can potentially migrate from the axle cavity into the wheel end assembly in an internally vented system. Such contaminant migration can threaten bearing assembly and main seal life in a manner similar to that found in external venting systems.

The present invention solves the problem of migration of contaminates from the axle cavity to the wheel end assembly in an internally vented system by disposing a filter in the axle cavity. The filter effectively blocks the movement of contaminates, but allows air flow between the wheel end assembly and the axle cavity to alleviate pressure build-up in the wheel end assembly, thereby preventing premature wear to the bearing assembly and/or main seal.

SUMMARY OF INVENTION

Objectives of the present invention include providing an axle filter for internally vented wheel end assemblies which prevents migration of contaminates from the axle cavity to the wheel end assembly, yet which provides for sufficient air flow from the wheel end assembly to the axle cavity to prevent excessive pressure build-up in the wheel end assembly.

Another objective of the present invention is to provide such an axle filter for internally vented wheel end assemblies, which is simple, inexpensive, reliable, and easy to install.

These objectives and advantages are obtained by an axle and wheel end assembly comprising, the wheel end assembly mounted on the axle, the wheel end assembly and the axle each being formed with an internal cavity, the cavities being in communication with each other for internal venting of the wheel end assembly cavity into the axle cavity, and at least one filter disposed in the axle, so that expanding gas from the wheel end assembly cavity can flow into the axle cavity and contaminates from the axle cavity are limited from migrating into the wheel end assembly cavity.

BRIEF DESCRIPTION OF THE DRAWINGS

The preferred embodiments of the invention, illustrative of the best mode in which applicants have contemplated applying the principles, is set forth in the following description and is shown in the drawings and is particularly and distinctly pointed out and set forth in the appended claims.

Similar numerals refer to similar parts throughout the drawings.

DESCRIPTION OF THE PREFERRED EMBODIMENT

Figure 1:
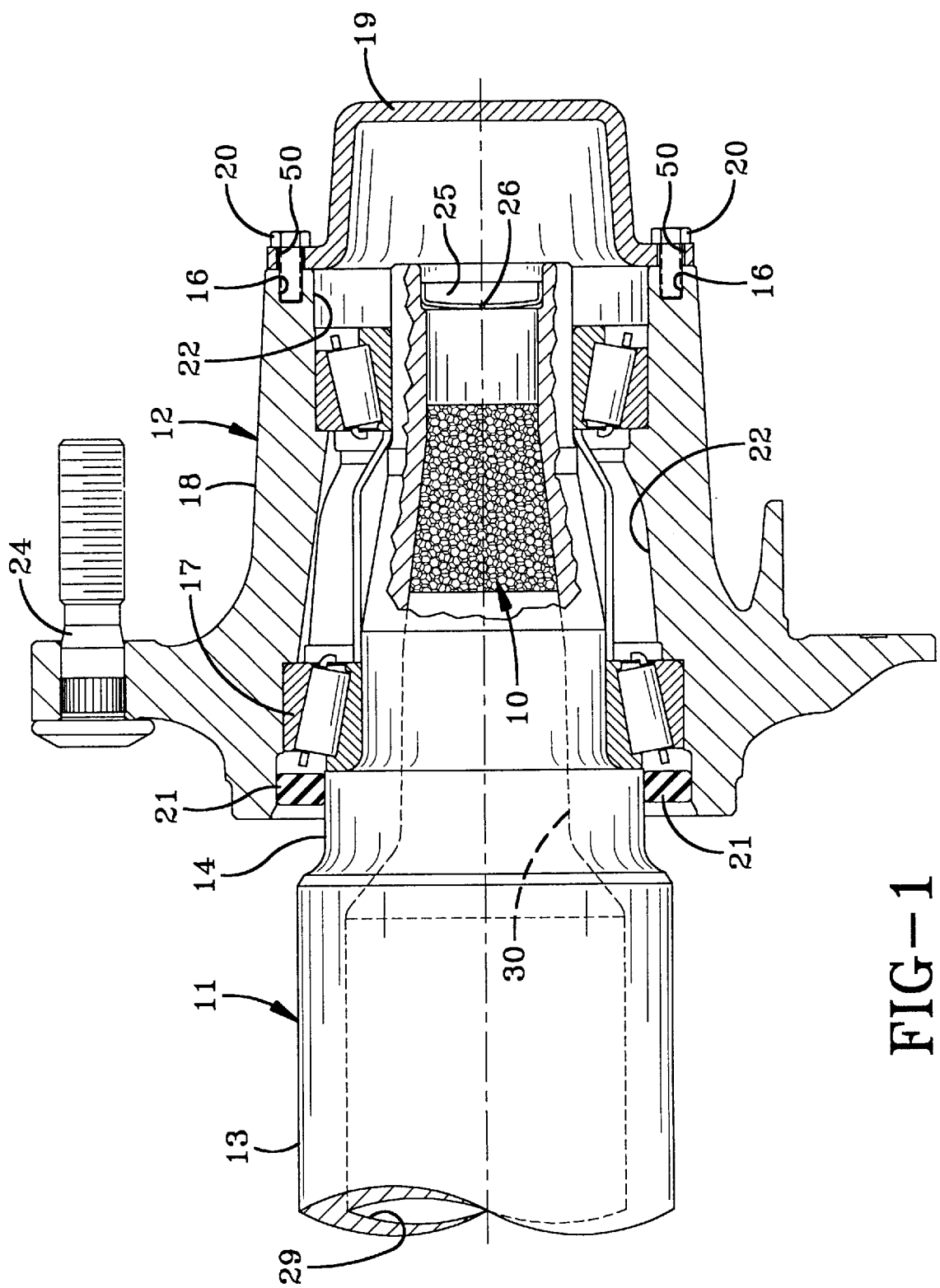
FIG. 1 is a fragmentary plan view showing the filter of the present invention incorporated in a heavy duty tractor-trailer axle/wheel end assembly, with portions broken away and shown in section, and hidden parts represented by dashed lines.
Figure 2:
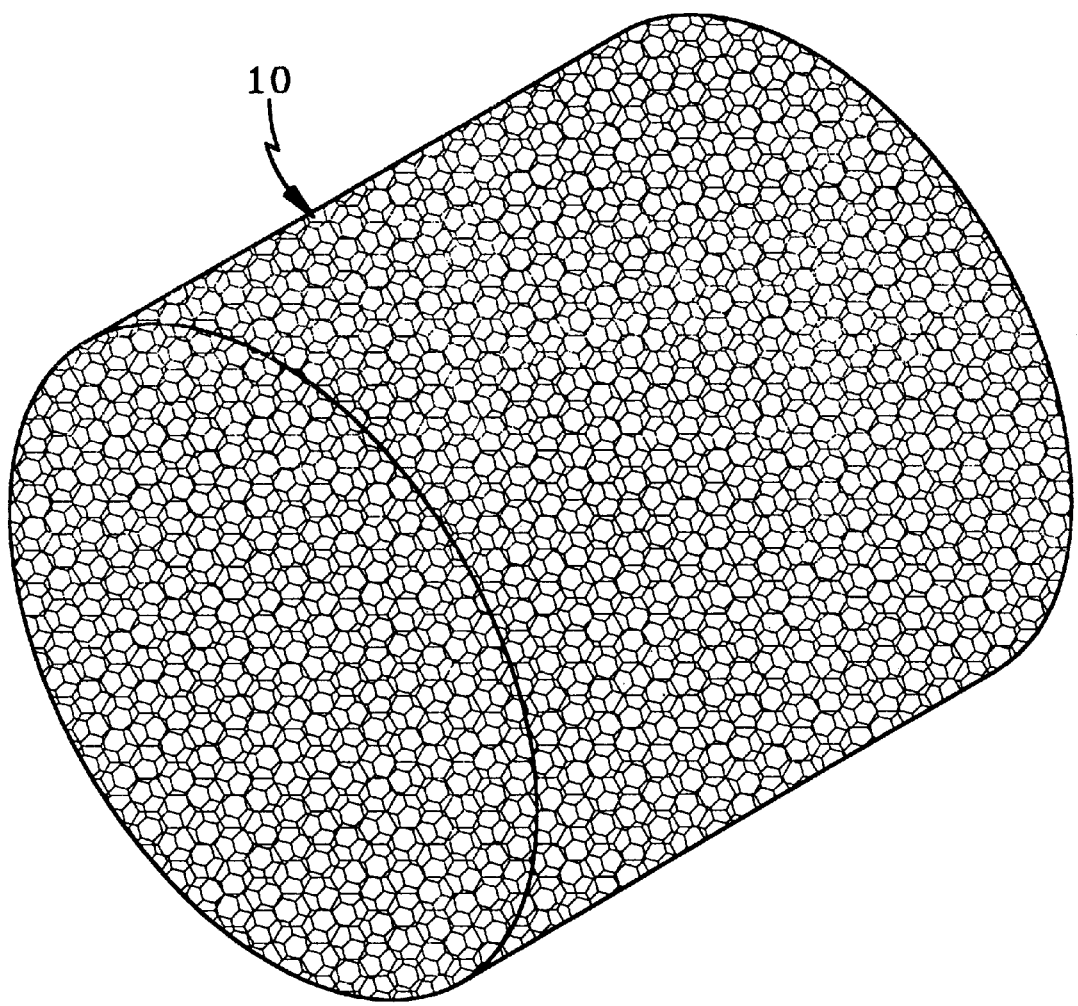
FIG. 2 is a perspective view of a first filter embodiment of the type incorporated in the axle/wheel end assembly of FIG. 1.

A first filter embodiment of the present invention is indicated at 10 in FIG. 2 and is shown in FIG. 1 disposed in a non-drive axle 11 having a wheel end assembly 12 mounted on an outboard end of the axle, wherein the axle and the wheel end assembly are of the type commonly used in heavy duty tractor-trailer applications.

In order to better understand the environment, in which first filter embodiment 10 of the present invention is utilized, axle 11 and wheel end assembly 12 will now be described in greater detail. Axle 11 depends from and extends transversely across the trailer of a heavy-duty tractor-trailer (not shown) of the type, which is well known to the art, and to the literature. A typical heavy-duty tractor-trailer includes one or more non-drive axles 11 mounted on the trailer, with a wheel end assembly 12 mounted on each end of each axle. For the sake of clarity, only one axle end and wheel end assembly will be described herein. Axle 11 includes a central section 13 and a spindle section 14 integrally connected by any suitable means to each end of the central section (only one end shown). Axle central section 13 and axle spindle section 14 each is generally tubular-shaped having an internal cavity 29, 30, respectively.

Wheel end assembly 12 includes a bearing assembly 17 immovably mounted on the outboard end of axle spindle section 14, and a hub 18 is rotatably mounted on bearing assembly 17 in a manner well known to those skilled in the art. A hubcap 19 is mounted on the outboard end of hub 18 by a plurality of bolts 20 which each pass through a respective one of a plurality of openings 50 formed in the hubcap and threadably engage a respective one of a plurality of aligned threaded openings 16 formed in the hub. Hubcap 19 thus closes the outboard end of wheel end assembly 12. A main continuous seal 21 is rotatably mounted on the inboard end of wheel end assembly 12 and closes the inboard end of the assembly. More particularly, seal 21 is mounted on wheel end assembly 12 in a suitable manner and abuts hub 18, bearing assembly 17 and axle spindle section 14 to seal an internal cavity 22 of the wheel end assembly defined by the axle spindle section, the bearing assembly and the hub. An end cap 25 formed with a small central opening 26 is press fit in the outboard end of axle spindle section cavity 30 to provide air flow communication between internal cavities 29, 30 of central axle section 13 and axle spindle section 14, respectively, and internal cavity 22 of wheel end assembly 12, for internal venting of pressure from the wheel end assembly into axle 11, as will be described in greater detail below. In order to maintain proper lubrication and operation of bearing assembly 17, a suitable amount of lubricant is introduced into wheel end assembly internal cavity 22. A plurality of threaded bolts 24 (only one shown) are used to mount a drum, tire rim and tire (not shown) on wheel end assembly 12.

In accordance with one of the important features of the present invention, filter 10 of a first embodiment of the present invention (FIG. 2) is disposed within axle spindle section 14 (FIG. 1) to prevent contaminates such as oxide scale from migrating from axle cavities 29, 30 to wheel end assembly cavity 22, and possibly adversely affecting the life expectancy of bearing assembly 17 and/or main seal 21. However, air flow between cavities 22 and 29, 30 still is maintained despite the presence of filter 10, to facilitate internal venting of any expanding gas from cavity 22 into accumulator cavities 29, 30. Although many prior art wheel end assemblies utilize a small port, usually located in the hubcap, for external venting of any expanding gas from the wheel end assembly cavity, such externally vented systems are subject to contamination by water and particles from the external atmosphere which can adversely affect bearing and/or seal life. Moreover, if such an external port becomes clogged, it can lead to premature seal degradation due to pressure differentials between the wheel end assembly cavity atmosphere and the external atmosphere, resulting in excessive side loading on the main seal.

Filter 10 preferably is formed of SIF® flexible polyurethane open cell foam, having a porosity of 30 ppi, and is available from Foamex International, Inc. of Linwood, Pa. Filter 10 preferably is cylindrical-shaped and has a diameter generally equal to its length. The diameter of filter 10 also must be at least as large as the widest diameter of the portion of axle spindle cavity 30 which it fills. Filter 10 preferably is located adjacent to, but spaced from, axle spindle end cap 25. Filter 10 is force fit in axle spindle cavity 30, either through the inboard end of axle spindle section 14 prior to its connection to central axle section 13, or through the outboard end of the spindle after connection of the spindle to the central section but prior to press fitting of end cap 25 in the outboard end of the axle spindle. The cylindrical shape and size of filter 10 prevents improper seating of the filter in axle spindle cavity 30.

Figure 3:
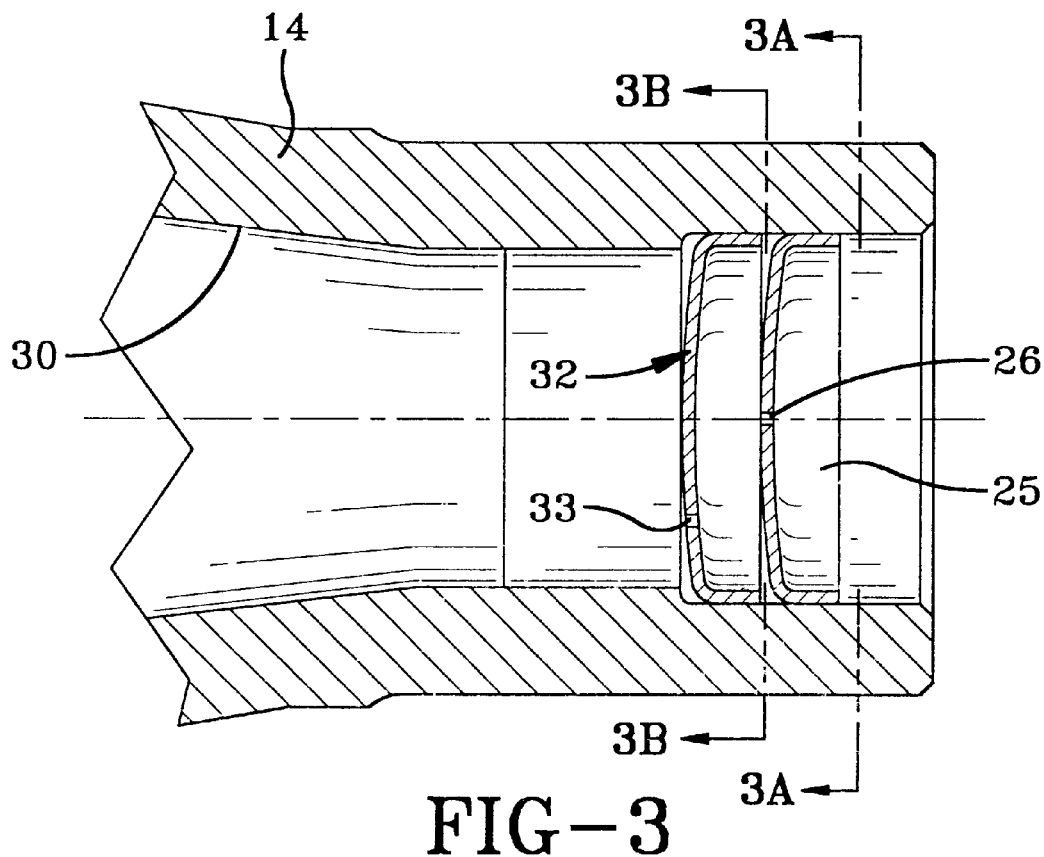
FIG. 3 is a fragmentary sectional view of the outboard end of the axle spindle of FIG. 1, with the wheel end assembly removed, and showing a second filter embodiment of the present invention incorporated therein.
Figure 3A:
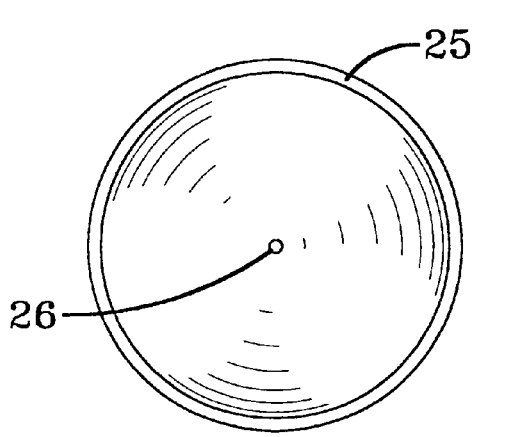
FIG. 3A is a view, looking in the direction of line 3A—3A of FIG. 3, of the end cap of the second filter embodiment with the axle spindle removed.
Figure 3B:
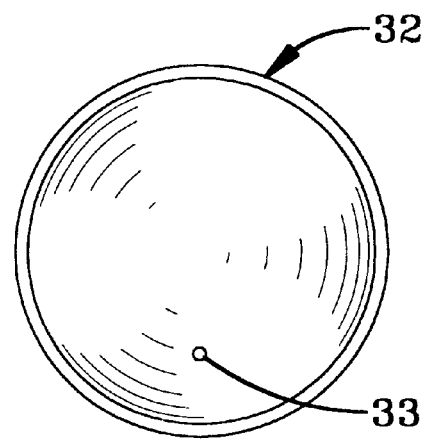
FIG. 3B is a view, looking in the direction of line 3B—3B of FIG. 3, of the inboard baffle cap of the second filter embodiment with the axle spindle removed.

A second filter embodiment of the present invention is indicated at 32 in FIG. 3B and is shown in FIG. 3 disposed in axle spindle section 14. Filter 32 is a cap similar to axle spindle end cap 25, but rather than having a central opening 26 as in end cap 25 (FIG. 3A), is formed with an opening 33 offset from the center of the cap. Thus, upon press fit installation of filter 32 and end cap 25 in adjacent relationship in the outboard end of axle spindle cavity 30, openings 33 and 26 are out of alignment. This baffle arrangement between filter opening 33 and end cap opening 26 lessens the possibility of contaminates migrating from internal axle cavities 29, 30 into wheel end assembly cavity 22.

Figure 4:
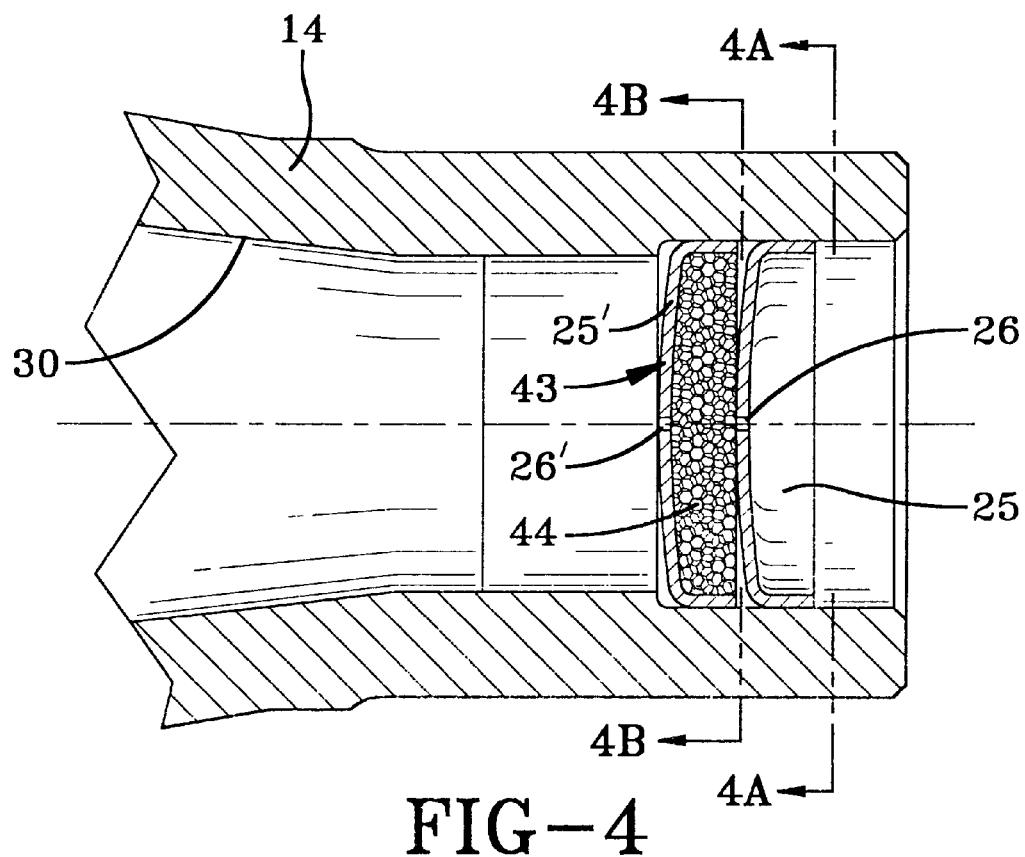
FIG. 4 is a fragmentary sectional view similar to FIG. 3, and showing a third filter embodiment of the present invention incorporated in the axle spindle.
Figures 4A, 4B:
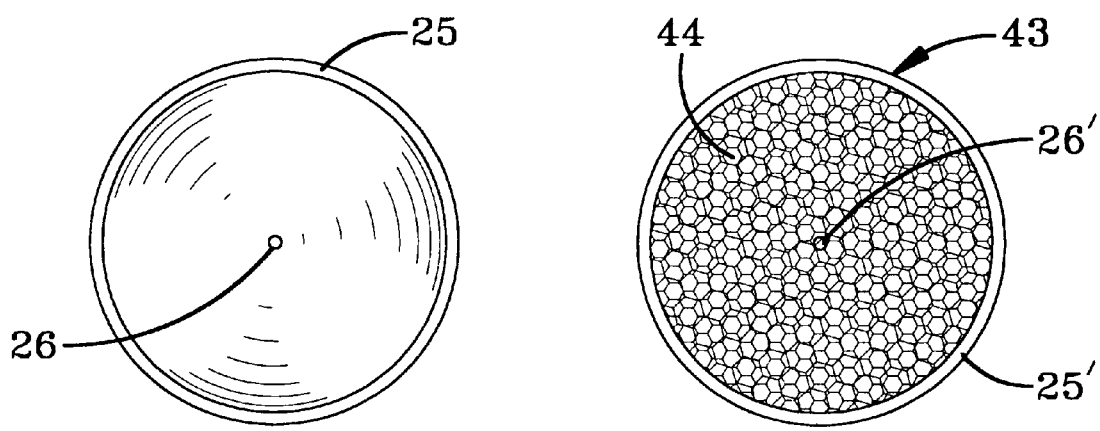
FIG. 4A is a view, looking in the direction of line 4A—4A of FIG. 4, of the end cap of the third filter embodiment with the axle spindle removed.
FIG. 4B is a view, looking in the direction of line 4B—4B of FIG. 4, of the inboard filter element cap and filter element of the third filter embodiment with the axle spindle removed.

A third filter embodiment of the present invention is indicated at 43 in FIG. 4B and is shown in FIG. 4 disposed in axle spindle section 14. Filter 43 includes a cap 25' having a central opening 26' similar to axle spindle end cap 25 (FIG. 4A), and having a filter element 44 friction fitted in the cap. Filter element 44 preferably is formed of the same material as filter 10 of the present invention described hereinabove. Thus, upon press fit installation of filter cap 25' and end cap 25 in adjacent relationship in the outboard end of axle spindle cavity 30, filter element 44 prevents contaminates from migrating from internal axle cavities 29, 30 into wheel end assembly cavity 22.

Figure 5:
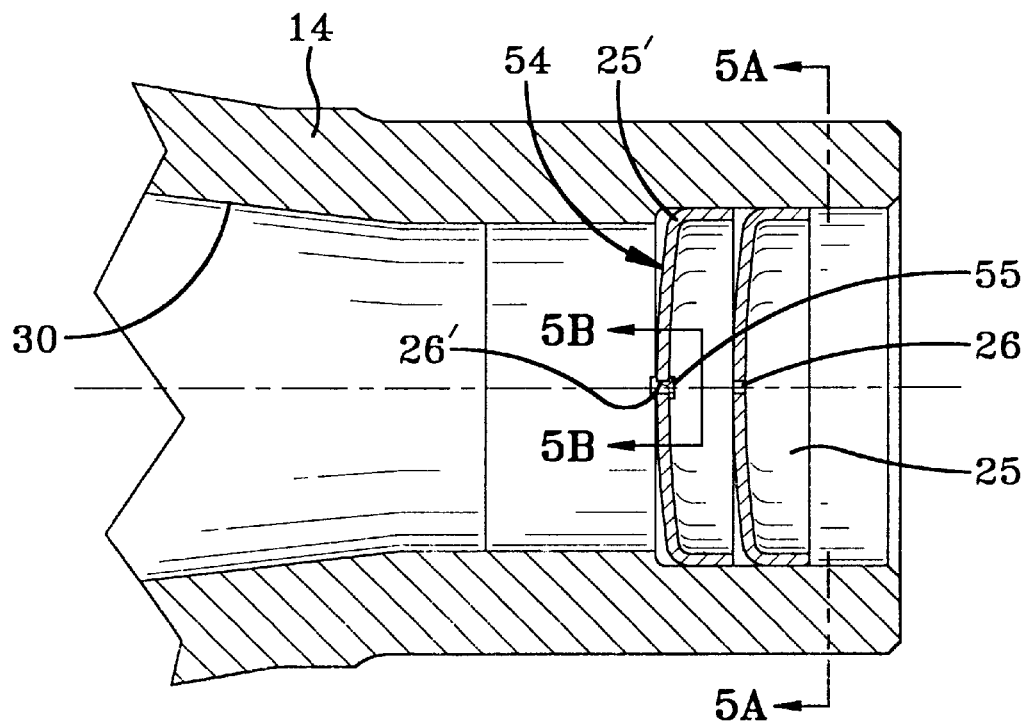
FIG. 5 is a fragmentary sectional view similar to FIGS. 3 and 4, and showing a fourth filter embodiment of the present invention incorporated in the axle spindle.
Figures 5A, 5B:
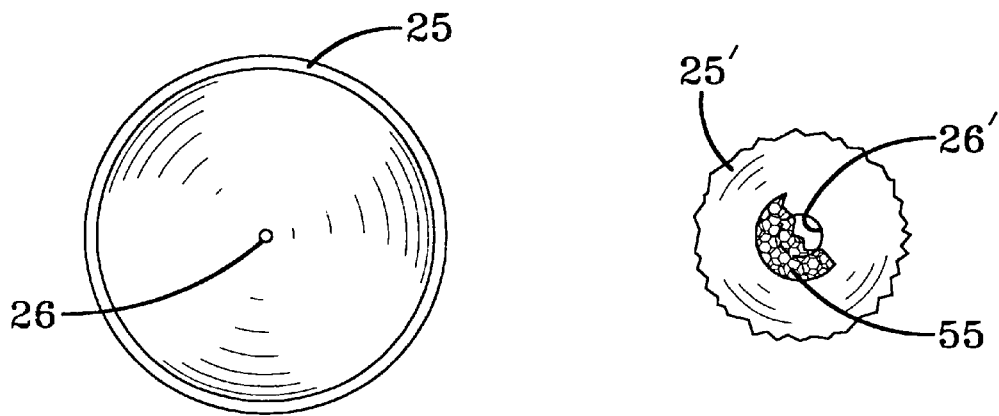
FIG. 5A is a view, looking in the direction of line 5A—5A of FIG. 5, of the end cap of the fourth filter embodiment with the axle spindle removed.
FIG. 5B is a view, looking in the direction of line 5B—5B of FIG. 5, of a fragmentary portion of the inboard filter element cap and filter element of the fourth filter embodiment.

A fourth filter embodiment of the present invention is indicated at 54 and is shown in FIG. 5 disposed in axle spindle section 14. Filter 54 includes a cap 25' having a central opening 26' similar to axle spindle end cap 25 (FIG. 5A), and having a filter element 55 captured by the cap in the opening (FIG. 5B). Filter element 55 covers the entire opening 26' and preferably is formed of the same material as filter 10 of the present invention. Thus, upon press fit installation of filter cap 25' and end cap 25 in adjacent relationship in the outboard end of axle spindle cavity 30, filter element 55 prevents contaminates from migrating from internal axle cavities 29, 30 into wheel end assembly cavity 22.

Figure 6:
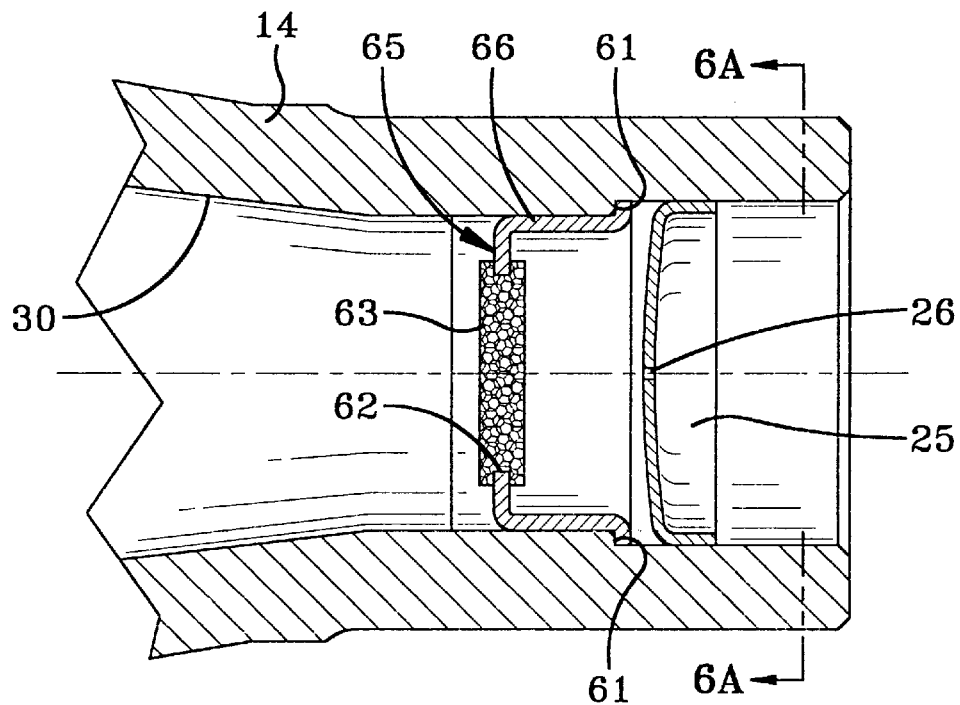
FIG. 6 is a fragmentary sectional view similar to FIGS. 3, 4 and 5, and showing a fifth filter embodiment of the present invention incorporated in the axle spindle.
Figure 6A:
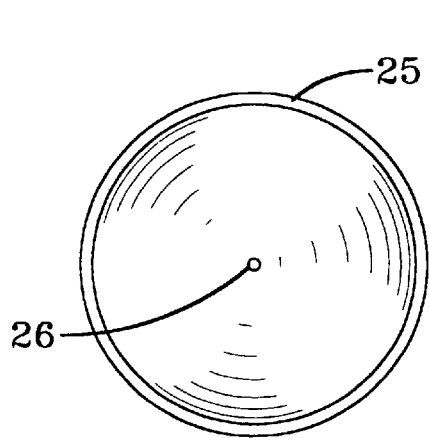
FIG. 6A is a view, looking in the direction of line 6A—6A of FIG. 6, of the end cap of the fifth filter embodiment with the axle spindle removed.
Figure 6B:
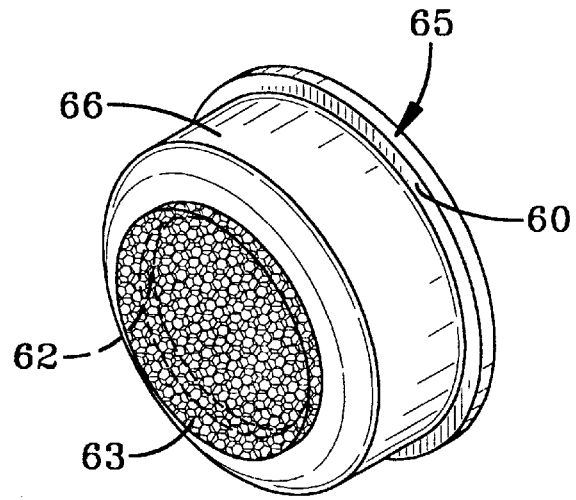
FIG. 6B is a perspective view of the inboard filter element cup and filter element of the fifth filter embodiment of the present invention.

A fifth filter embodiment of the present invention is indicated at 65 in FIG. 6B and is shown in FIG. 6 disposed in axle spindle section 14. Filter 65 includes an inboardly extending cup 66 formed with an annular flange 60 and a central opening 62. A filter element 63, preferably formed of the same material as utilized in first filter embodiment 10 of the present invention, is captured by cup 66 in central opening 62 and covers the entire opening. Thus, upon press fit installation of cup 66 in the outboard end of axle spindle cavity 30 wherein cup flange 60 abuts axle spindle ledge 61, and press fit installation of end cap 25 (FIG. 6A) in the cavity outboardly adjacent to cup 66, filter element 63 prevents contaminates from migrating from internal axle cavities 29, 30 into wheel end assembly cavity 22.

It is understood that axle filter embodiments 10, 32, 43, 54, and 65 of the present invention can be used in various styles of non-drive axles and wheel end assemblies without affecting the overall concept of the present invention. It also is understood that other filter element materials can be utilized without affecting the overall concept of the present invention, so long as the material is porous or semi-porous to air and limits the migration of any contamination through the filter. Moreover, the filter could comprise a plurality of filter elements.

Other suitable filter element materials include polyester, breathable rubber, porous metal, paper, and teflon fabric. Furthermore, the filter and/or filter element can be made to various shapes and sizes, so long as the filter limits the likelihood of migration of contaminates either by having a shape and size complementary to or deforming to the shape and size of axle spindle cavity 30.

Figure 7:
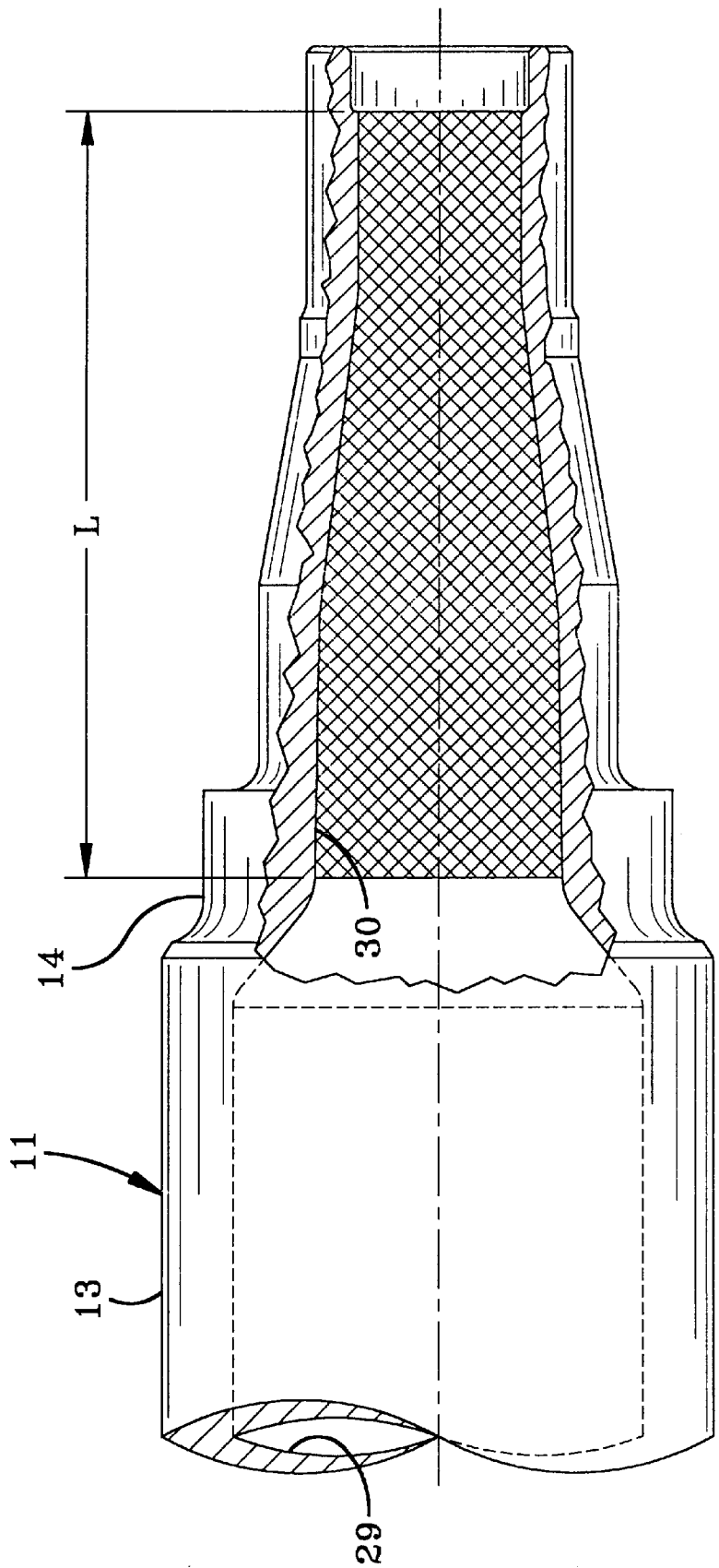
FIG. 7 is a fragmentary plan view of the axle, with portions broken away and shown in section, and hidden parts represented by dashed lines, showing the preferred zone for placement of the filter of the present invention in the axle spindle.

Moreover, it is understood that the filter can be disposed anywhere within axle spindle filter zone L shown in FIG. 7. The exact location depends on the type of filter and lubricating substance used for bearing assembly 17, with generally a more inboard location being preferred for grease applications and a more outboard location being preferable for oil applications. It is understood that interior cavity 30 of axle spindle section 14 is generally cleaner than interior cavity 29 of axle central section 13, which is in part the reason for location of the filter in zone L of the axle spindle section. It further can be appreciated that the closer the filter of the present invention is placed to the outboard end of axle spindle section 14, the less likely that contamination migration will occur, from either axle spindle cavity 30 or axle central section cavity 29, into wheel end assembly cavity 22. However, it is noted that some contamination limiting benefit could be obtained from the filter of the present invention, even if it were disposed inboard of zone L either in axle spindle section 14 or central axle section 13. Similarly, some contamination limiting benefit could be realized if only a single filter were disposed in axle 11, rather than disposing a filter in zone L of each axle spindle section 14 of the axle.

Accordingly, the axle filter of the present invention for internally vented wheel end assemblies is simplified, provides an effective, safe, inexpensive and efficient filter which achieves all of the enumerated objectives, provides for eliminating difficulties encountered with prior internally vented wheel assemblies, and solves problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the axle filter for internally vented wheel assemblies is constructed, arranged and used, the characteristics of the construction and arrangement, and the advantageous, new and useful results obtained; the new and useful structures, devices, elements, arrangements, parts and combinations, are set forth in the appended claims.

What is claimed is:

1. An axle and wheel end assembly comprising: said wheel end assembly mounted on said axle, the wheel end assembly and the axle each being formed with an internal cavity, said cavities being in communication with each other for internal venting of said wheel end assembly cavity into said axle cavity, and at least one filter disposed in said axle, so that expanding gas from the wheel end assembly cavity can flow into the axle cavity and contaminates from said axle cavity are limited from migrating into said wheel end assembly cavity.

2. The axle and wheel end assembly of claim 1, in which said axle includes a central section and an axle spindle section integrally attached to each end of said central section; in which one of said wheel end assemblies is mounted on each of said axle spindle sections; and in which a first end cap formed with a substantially small first opening is press fitted in the outboard end of each of the axle spindle sections, to provide for communication between said axle cavity and said wheel end assembly cavities.

3. The axle and wheel end assembly of claim 2, in which a second end cap formed with a substantially small second opening is press fitted in said axle spindle section inboard from and adjacent to said first end cap; and in which said second end cap second opening is offset from said first end cap first opening.

4. The axle and wheel end assembly of claim 2, in which said filter is friction fit in said axle spindle section inboard from and adjacent to said first end cap.

5. The axle and wheel end assembly of claim 4, in which said filter is formed of a flexible polyurethane open cell foam having a porosity of about 30 ppi.

6. The axle and wheel end assembly of claim 2, in which a second end cap formed with a substantially small second opening is press fitted into said axle spindle section inboard from and adjacent to said first end cap; and in which said second end cap second opening is substantially aligned with said first end cap first opening.

7. The axle and wheel end assembly of claim 6, in which a filter element is friction fit in said second end cap.

8. The axle and wheel end assembly of claim 7, in which said filter element is formed of a flexible polyurethane open cell foam having a porosity of about 30 ppi.

9. The axle and wheel end assembly of claim 6, in which a filter element is captured in said second end cap second opening.

10. The axle and wheel end assembly of claim 9, in which said filter element is formed of a flexible polyurethane open cell foam having a porosity of about 30 ppi.

11. The axle and wheel end assembly of claim 2, in which a cup formed with a substantially large central opening is press fitted into said axle spindle section inboard from and adjacent to said first end cap.

12. The axle and wheel end assembly of claim 11, in which a filter element is captured in said cup central opening.

13. The axle and wheel end assembly of claim 12, in which said filter element is formed of a flexible polyurethane open cell foam having a porosity of about 30 ppi.

14. An axle and wheel end assembly comprising: said axle including a central section and an axle spindle section integrally attached to each end of said central section, one of said wheel end assemblies being mounted on each of said axle spindle sections, each of the wheel end assemblies and the axle being formed with an internal cavity, said cavities being in communication with each other for internal venting of each of the wheel end assembly cavities into the axle cavity, a first end cap formed with a substantially small first opening being press-fitted in an outboard end of each of the axle spindle sections to provide for said communication between said cavities, a filter for enabling expanding gas from the wheel end assembly cavity to flow into the axle cavity to limit the migration of contaminates from said axle cavity to said wheel end assembly cavity, wherein said filter is selected from said group comprising a filter element disposed in the axle cavity; a second end cap formed with a substantially small second opening press-fitted in said axle spindle section inboard from and adjacent to said first end cap, said second end cap second opening being offset from said first end cap first opening; a second end cap formed with a substantially small second opening press-fitted in the axle spindle section inboard from and adjacent to the first end cap, the second end cap second opening being substantially aligned with the first end cap first opening; with a filter element formed of a flexible polyurethane open cell foam having a porosity of about 30 ppi being friction fit in said second end cap; a second end cap formed with a substantially small second opening press-fitted in said axle spindle section inboard from and adjacent to said first end cap, said second end cap second opening being substantially aligned with said first end cap first opening, with a filter element formed of a flexible polyurethane open cell foam having a porosity of about 30 ppi being captured in the said second end cap second opening; or a cup formed with a substantially large central opening being press-fitted in the axle spindle section inboard from and adjacent to the first end cap, with a filter element formed of a flexible polyurethane open cell foam having a porosity of about 30 ppi being captured in said cup central opening.

* * * * *